(12) United States Patent
Crossno et al.

(10) Patent No.: US 7,233,247 B1
(45) Date of Patent: Jun. 19, 2007

(54) METHOD AND SYSTEM FOR EMPLOYING RFID TAGS IN AUTOMATED APPLICATIONS

(75) Inventors: Adam Crossno, Flower Mound, TX (US); Viswanath Puttagunta, Irving, TX (US); Ravi Kumar Viswaraju, Richardson, TX (US)

(73) Assignee: SAVR Communication Inc., Irving, TX (US)

( * ) Notice: Subject to any disclaimer, the term of this patent is extended or adjusted under 35 U.S.C. 154(b) by 185 days.

(21) Appl. No.: 11/039,221

(22) Filed: Jan. 20, 2005

(51) Int. Cl.
*G08B 13/14* (2006.01)
(52) U.S. Cl. .................. 340/572.1; 340/10.1
(58) Field of Classification Search .. 340/572.1–572.9, 340/5.2, 5.52, 10.1
See application file for complete search history.

(56) References Cited

U.S. PATENT DOCUMENTS

| | | | |
|---|---|---|---|
| 5,537,094 A | * | 7/1996 | Bettine et al. ............ 340/572.4 |
| 5,798,693 A | * | 8/1998 | Engellenner ............. 340/10.33 |
| 2005/0055582 A1 | * | 3/2005 | Bazakos et al. ............ 713/202 |
| 2006/0145865 A1 | * | 7/2006 | Forster .................... 340/572.8 |
| 2006/0174130 A1 | * | 8/2006 | Noble ........................ 713/182 |

* cited by examiner

*Primary Examiner*—Phung T. Nguyen
(74) *Attorney, Agent, or Firm*—Bruce C. Lutz

(57) ABSTRACT

A method and an apparatus are provided for Radio Frequency Identification (RFID). An RFID base unit is provided that can communicate with at least two different types of RFID tags that are commercially available. Additionally, the RFID base unit can communicate with any number of devices, including but not limited to computer networks, which allow for dynamic access and updates to tailor the RFID base unit for virtually any situation. Particularly, the RFID base unit would be useful in safety and/or security applications to enable and disable automated devices.

15 Claims, 4 Drawing Sheets

METHOD AND SYSTEM FOR EMPLOYING RFID TAGS IN AUTOMATED APPLICATIONS

FIELD OF THE INVENTION

The present invention relates generally to Radio Frequency Identification (RFID) and, more particularly, to employment of RFID tags and devices in automated applications.

DESCRIPTION OF THE RELATED ART

RFID tags and devices have been around since World War II. The first known usage of RFID tags was by the United Kingdom's Royal Air Force. The RAF placed RFID tags in their aircraft, so that the Spitfires and other allied aircraft could be distinguished from German aircraft.

Over the years, though, RFID tags have become more ubiquitous. RFID tags are commercially available in a wide variety of applications ranging from implanted tags for keeping track of pets to toll tags. Categorically, there are three types of RFID tags commercially available: passive, semi-passive, and active. Passive tags are unpowered RFID tags that utilize radiation or electromagnetic fields in order to function. Active tags have their own power source, and semi-active tags utilize both an internal power supply and absorbed radiation or electromagnetic fields.

Referring to FIG. 1A of the drawings, the reference numeral 100 generally designates a passive RFID tag that utilizes wave reflection. Typically, the passive RFID tag 100 comprises an antenna 102, Radio Frequency (RF) Circuits 104, and an Identification (ID) circuit 106.

The passive RFID tag 100 is, by definition, unpowered. Radiation is received by the antenna 102 and transmitted to the RF circuits 104 through the communication channel 108. The RF circuits 104 can then de-modulate or processes the signals received by the antenna 102. The processed signals are then communicated to the ID circuit 106 through the communication channel 110, where the ID circuit 106 generates an ID number or some other identification signal. Once the ID circuit 106 generates an identifying signal, the RF circuit 104 and the antenna 102 can then transmit the identifying signal.

Therefore, by receiving an electromagnetic signal, processing it, and retransmitting it, the passive RFID tag 100 essentially reflects the received radiation. So, by varying the ID circuitry 106 and/or the RF circuitry 104, each tag, such as the passive RFID tag 100, can reflect radiation differently causing each tag to be distinguishable.

There are a wide variety of applications for RFID tags similar to the passive RFID tag 100. Typically, tags, like tag 100, are low cost and robust. However, the physical range and flexibility of tags, like the tag 100, are limited.

Referring to FIG. 1B of the drawings, the reference numeral 150 generally designates an active RFID tag. Typically, the active RFID tag 150 comprises an antenna 102, Radio Frequency (RF) Circuits 104, an Identification (ID) circuit 106, and a battery 112.

The active RFID tag 150 is, by definition, powered. Under the circumstance of having a powered RFID tag, there are a larger number of operations that can be performed by the active RFID tag 150. Signals can be received and transmitted by the antenna 102, which provides the signals to the RF circuits 104 through the communication channel 108. The RF circuits 104 can then modulate and de-modulate signals.

Because the active RFID tag 150 is powered by the battery 112, the ID circuits 106 can be operating constantly. The ID circuit 106 can both send signals to and receive signals from the RF circuits 104 through the communication channel 110. The ID circuit 106 can generate identifying signals or be in active communication with another RFID station. Hence, information contained on the RFID tag 150 can be updated or changed.

There are also a wide variety of applications for RFID tags similar to the active RFID tag 150. Typically, tags, like tag 150, are flexible and robust. However, the physical range and time of operation, like the tag 150(100), are limited. The batteries, such as the battery 112, will need periodic replacing or charging in order for tags, like the tag 150, to continue functioning.

There are also other types of alternately powered RF tags. Referring to FIG. 2A of the drawings, the reference numeral 200 generally designates a passive RFID tag powered by a magnetic field. The tag 200 comprises an inductor 202, power generation circuitry 204, a microcontroller 206, RF circuits 208, and an antenna 210.

The tag 200 is different, in that a magnetic coupling is needed. When the tag 200 enters into a changing magnetic field of sufficient strength, the inductor 202 couples to the field. The changing magnetic field induces a current in the inductor 202, which provides current to the power generation circuitry 204. Power can then be provided to the microcontroller 206 and the RF circuits 208 through the communication channel 212.

Once powered, the antenna 210 can send and receive information with external devices. The microcontroller 206 communicates with the RF circuits 208 through the communication channel 214 to allow for signal transmission and reception. Also, because power can be applied for long periods of time due to the magnetic coupling, it is possible to write data to the microcontroller 206 and to change information when desired.

For tags, like the tag 200, there are a wide variety of applications for RFID tags. For example, tags implanted into pets utilize a tag similar to the tag 200. These tags are typically flexible and robust. However, the physical range and time of operation are limited. A magnetic field must be provided in order for the tag 200 to function, and providing such a magnetic field can be costly in terms of power consumption.

Referring to FIG. 2B of the drawings, the reference numeral 250 generally designates a semi-passive RFID tag. The tag 250 comprises an inductor 202, power generation circuitry 204, a microcontroller 206, RF circuits 208, an antenna 210, and a battery 212.

The tag 250 is similar to the tag 200, in that a magnetic coupling is needed. However, only part of the circuitry is powered through the magnetic coupling. When the tag 250 enters into a changing magnetic field of sufficient strength, the inductor 202 couples to the field. The changing magnetic field induces a current in the inductor 202, which provides current to the power generation circuitry 204. Power can then be provided to the RF circuits 208 through the communication channel 212. The microcontroller 206, though, is constantly powered by the battery 212.

Once powered, the antenna 210 can send and receive information with external devices. The microcontroller 206 communicates with the RF circuits 208 through the communication channel 214 to allow for signal transmission and reception. Also, because power is constantly applied to the microcontroller 206, it is possible to write data to the microcontroller 206 and to change information when desired.

For tags, like the tag 250, there are a wide variety of applications for RFID tags. For example, tags implanted into pets utilize a tag similar to the tag 250. These tags are typically flexible and robust. However, the physical range and time of operation are limited. A magnetic field must be provided in order for the tag 250 to function. Providing such a magnetic field can be costly in terms of power consumption. Additionally, the battery 212 may have to be periodically changed or recharged, which can be costly.

In each case, the RIFD tags 100, 150, 200, and 250 each function in concert with an RFID base unit. Traditionally, RFID base units were tailored for specific types of tags. The RFID base units have also been tailored for specific applications, and have not been necessarily monitored. With the ever increasing utility of RFID tags, employment of a system that is easily monitored and easily established is desirable. Therefore, there is a need for a method and/or apparatus for communicating with a multitude of devices and RFID tags that at least addresses some of the problems associated with conventional RFID base units.

SUMMARY OF THE INVENTION

The present invention provides a method and a system for securing an external device with an RFID base unit. An RFID base unit is provided that is adapted to communicate with at least a first and a second RFID tag type of a plurality of RFID tag types. An RFID tag then interfaces with the RFID base unit, where the RFID tag is of the first or the second RFID tag types. Once the at least one RFID tag interfaces with the RFID base unit, indicia of engagement, disengagement or other affect on the control or operation is communicated to the external device.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electro-magnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1A:
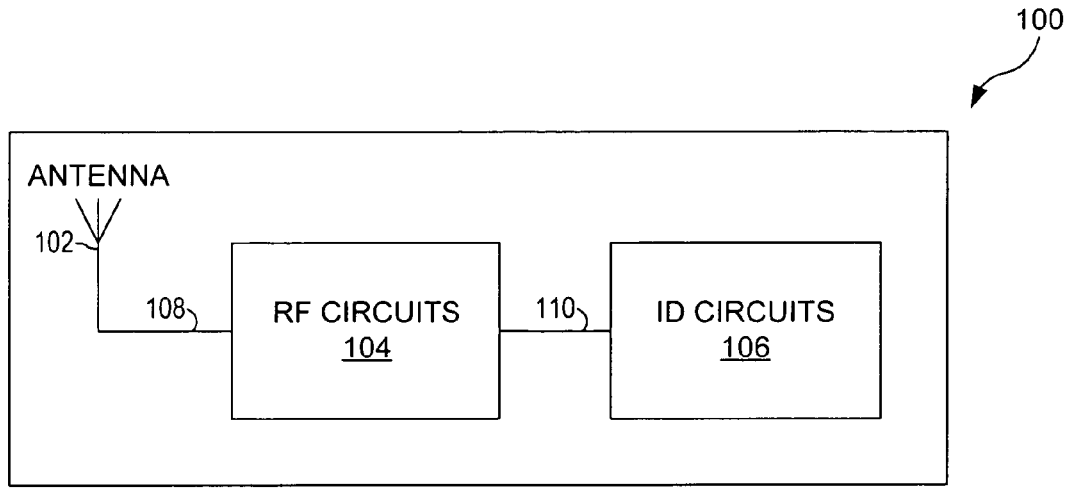
FIG. 1A is a block diagram depicting a conventional, passive RFID tag that utilizes wave reflection.
Figure 1B:
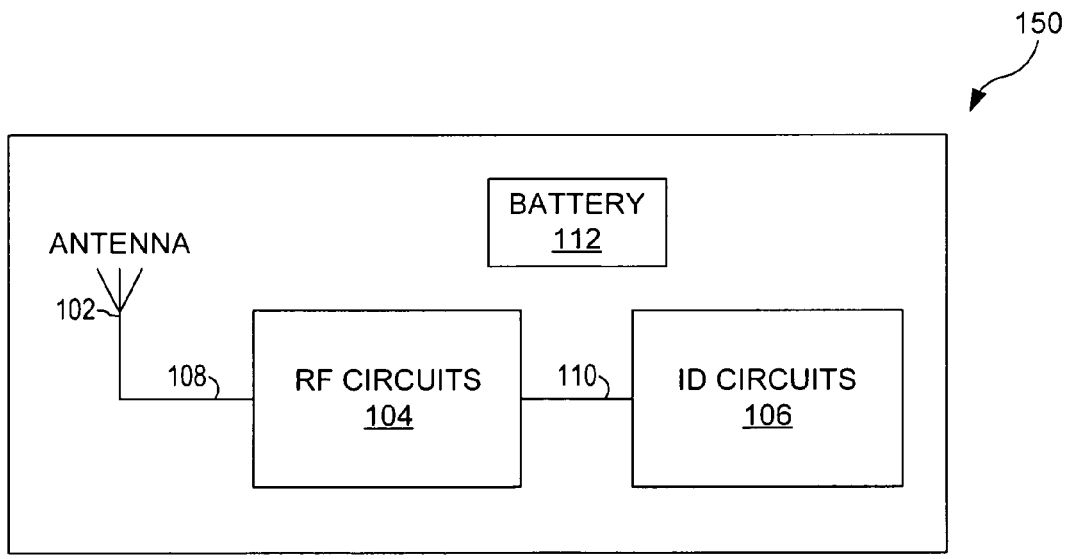
FIG. 1B is a block diagram depicting a conventional, active RFID tag.
Figure 2A:
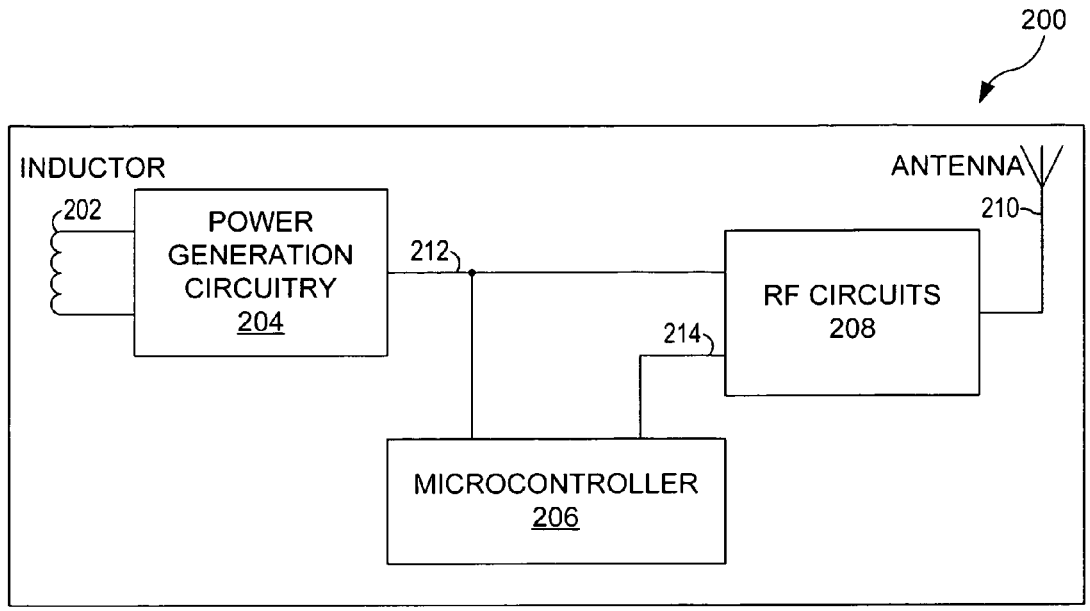
FIG. 2A is a block diagram depicting a conventional, passive RFID tag powered by a magnetic field.
Figure 2B:
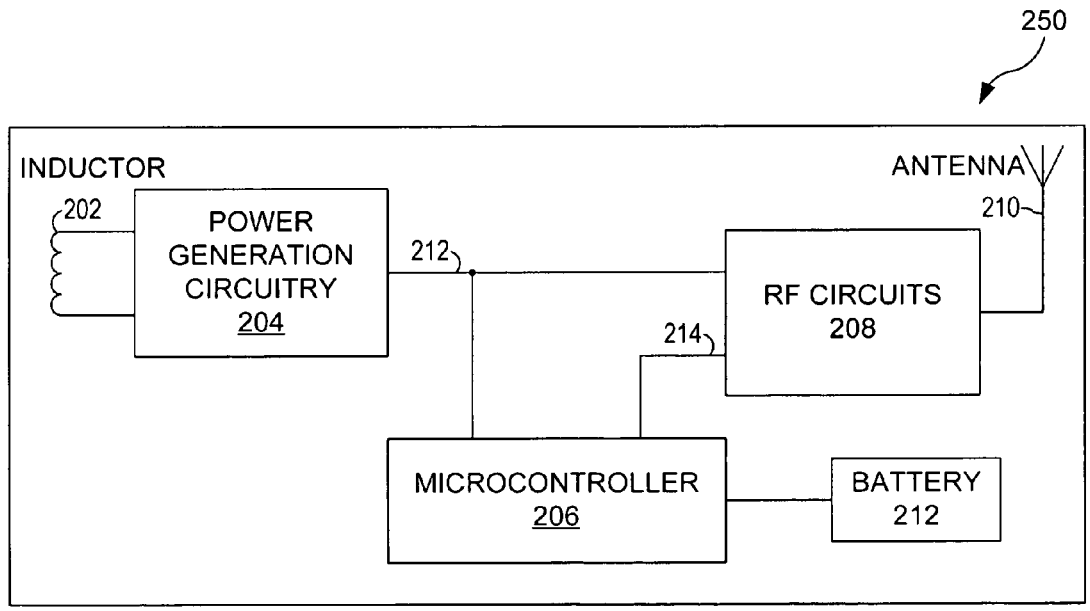
FIG. 2B is a block diagram depicting a conventional, semi-passive RFID tag.
Figure 3:
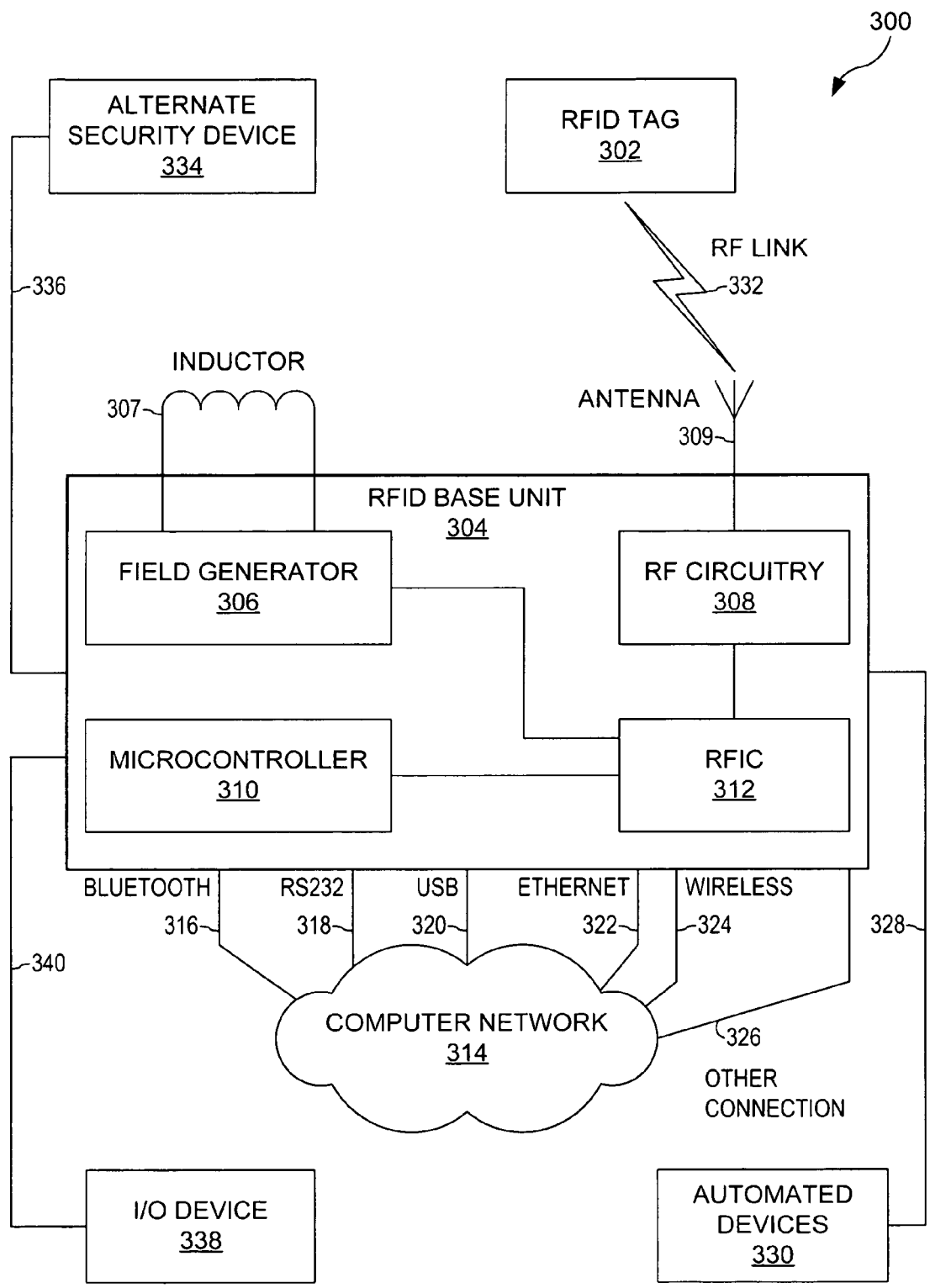
FIG. 3 is a block diagram depicting a RFID system.

Referring to FIG. 3 of the drawings, the reference numeral 300 generally designates a RFID system. The system 300 comprises a unified RFID base unit 304, an RFID tag 302, a computer network 314, automated devices 330, alternate security device 334, and an Input/Output (I/O) device 338.

In operation, there a number of configurations that can be employed. In all of the systems, the RFID tag 302 communicates with the RFID base unit 304 through an RF link 332. Depending on the type of RFID tag 302 desired, the RFID base unit 304 is equipped to communicate with any type of RFID tag.

At the center of the system 300 is the RFID base unit 304. The RFID base unit 304 further comprises a field generator 306, RF circuitry 308, an antenna 309, a microcontroller 310, and an RF Integrated Circuit (RFIC) 312. The RFIC 312 is coupled to the RF circuitry 308 and the microcontroller 310 through the communication channels 346 and 344, respectively. The RF circuitry 308 communicates information to and from the RFID tag 302 by utilizing the antenna 309 and the RF link 332. Additionally, the RF link 332 can be of multiple frequencies to communicate with standard low frequency RFID tags (between 125 kHz to 134 kHz), standard high frequency RFID tags (13.56 Mhz), standard Ultra High Frequency (UHF) RFID tags (868 Mhz to 956 MHz), and standard microwave RFID tags (2.45 GHz). The RFID base unit 304 can also be designed to be robust and powered by a variety of power sources. For example, the RFID base unit 304 can be powered by standard 110 VAC, batteries, rechargeable batteries, power over Ethernet, power over USB, etc.

Additionally, the RFID base unit 304 can be constructed using various housings for harsh environments. For example, a basic version, a shockproof version, a high/low temp environment version, a highly acidic/basic environment version, and so forth could be developed. Depending on the type of RFID tag 302, the field generator 306 can be engaged by the RFIC 312. Control information is provided to the field generator 306 from the RFIC 312 through the communication channel 342, and, when desired, the field generator 306 may not be utilized. Such case where the field generator 306 may not be utilized is when the RFID tag is a passive RFID that utilize a reflected wave, such as the tag 100. The field generator 306 is coupled to an inductor 307 for generating a magnetic field, when indicated, to provide power to a passive or semi-passive RFID tag. However, it is possible to have the field generator 306 deliver control information to a much larger generator with a large power source to generate a magnetic field.

Then, based on the configuration desired, the RFID base unit 304 can be coupled to a variety of other devices. To be able to interact with multiple devices, the microcontroller 310 can be flexible. The microcontroller 310 of the RFID base unit 304 can have memory which would include expandable volatile memory, such as Dynamic Random Access Memory (DRAM) or Static Random Access Memory (SRAM) and non-volatile memory, such as Hard Disk Drives and flash memory sticks. Additionally, standard operating systems, such as Windows CE® (Microsoft Corp, One Microsoft Way Redmond, Wash. 98052-6399) and VX Works, can be readily usable with the microcontroller 310. The microcontroller 310 can also be equipped to communicate with either a computer network 314, automated devices 330, and other devices through BlueTooth, RS232, Universal Serial Bus (USB), Ethernet, Wireless, T-carrier connections, Firewire® (Apple Computer, Inc., 1 Infinite Loop, Cupertino, Calif. 95014), Optical fiber, Zigbee® (Philips Electronics North American Corp., Avenue of the Americas New York, N.Y. 100201-104), etc. Examples of interconnection of the RFID base unit 304 with a variety of other devices can be seen with the communication channels 316, 318, 320, 322, 324, and 326. The RFID base unit 304, though, does not necessarily need to be connected to a network. Rather than using the network 314 to store information related to authorization, internal memory or other devices storing, accessing or otherwise obtaining the information may be used additionally or as another option.

By equipping the RFID base unit 304 to communicate with external devices, there are a variety of configurations. The RFID base unit 304 can be connected to a remote monitoring system or can be monitored over a computer network, such as the Internet. For example, a user can be notified of operation of a through Voice over Internet Protocol (VoIP) on a cell phone. Additionally, several RFID base units 304 could be interconnected or connected with a server. Hence, by having the ability to dynamically interconnect RFID base units 304 with one another and computer networks 314, the functionality of the RFID base unit 304 and RFID tags 302 can be dynamically changed for changing conditions. For example, RIFD tags 302 can have ID numbers dynamically updated, or the software of the microcontroller 310 can be updated.

The RFID base unit 304, though, has significant potential in controlling the operation of other external devices. For example, the RFID base unit 304 could be coupled to an automated device 330 by a communication channel 328. Automation equipment 330 can also be connected directly to the I/O module. The RFID base unit 304 can then enable or disable access to the automated device 330. The RFID base unit 304 can also be coupled to an I/O device 338 through the communication channel 340, where the RFID base unit 304 can be configured to receive and/or transmit digital and/or relay signals. For example, the RFID base unit 304 can be configured to communicate with Programmable Ladder Logic Controllers (PLCs) that are common in industrial applications or with other I/O modules.

The RFID base unit 304 can also be used to discontinue the operation of other external devices. For example, a Power Source Disconnect Module (PSDM) can be used in conjunction with the RFID base unit 304. The RFID base unit 304 could be helpful as a last line of safety type of device where one might want to turn a piece of equipment completely off if an operator gets too close. For example, an industrial laser can be extremely hazardous and would need to be off if an operator is too close. Additionally, the RFID base unit 304 can be used as a fail safe in case the operator can bypass the other safety devices. Alternatively or additionally, the RFID base unit 304 could be employed to signal a controller if the proper operator is not present and/or in an acceptable location to operate a device, such as a laser or other potentially harmful or otherwise important equipment.

In high security situations, additional security devices can be employed in conjunction with the RFID base unit 304. In FIG. 3, an alternative security device 334 can communicate with the RFID base unit 304 through the communication channel 336. Until conditions of both the RFID tag 302 and the alternative security device 334 are satisfied, access to an automated device or to an area is denied. For example, a fingerprint reader, an iris scanner, a retinal scanner, a facial recognition scanner, and so forth can be used as an alternative security device.

Specifically, the RFID base unit 304 is designed to have a great deal of flexibility. There are a large number of combinations of devices, RFID tags, and communication techniques that can be employed to yield that flexibility. Moreover, the RFID base unit 304 is designed to be a lower cost unit so that usage of RFID tags, particularly in commercial and industrial applications, can become more common.

Figure 4:
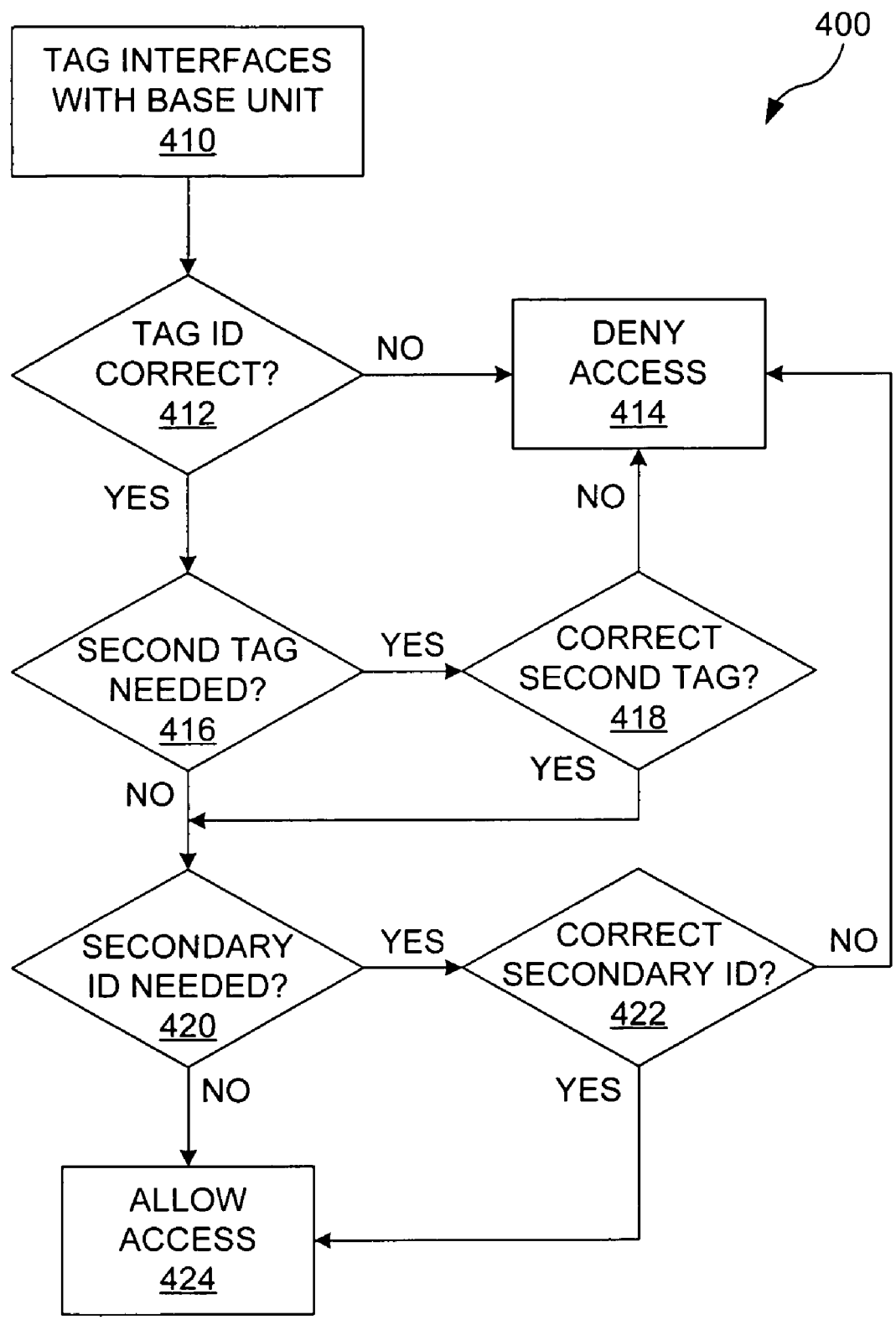
FIG. 4 is a flow chart depicting the usage of an RFID system in a safety or security application.

An example of the usage of the RFID system 300 in an industrial application is with safety or security. Referring to FIG. 4 of the drawings, the reference numeral 400 generally designates a flow chart depicting the usage of an RFID system in a safety or security application.

In step 410, an RFID tag interfaces the RFID base unit. The RFID tag can be any type of RFID tag. During the interface, the RFID tag can be energized, and the identification information (ID) is transmitted to the RFID base unit.

Once received, the ID is analyzed. A determination is made in step 412 of whether the ID is correct or sufficient to gain access. If the ID is not correct, access to a device or area is denied in step 414. For example, if an employee attempts to operate a milling machine and if the employee's ID is not cleared to operate the milling machine, then the mill will not function.

If the ID is determined to be sufficient to gain access to a device or area, a further determination is made as to if a second tag is necessary in step 416. In some industrial and commercial applications, it is necessary to have multiple parties present during the performance of an industrial function. For example the operators of an industrial press: at least two operators need to be present at all times when the equipment is in operation in case someone gets injured such that they cannot get or seek medical attention on their own. The second tag can then be analyzed to determine if the second ID is correct. If the second ID is not correct, then access is again denied in step 414.

Once the RFID tags have proven sufficient to gain access to a device or area, a determination is made in step 420 to determine if a secondary ID is needed. If needed, then a determination is made in step 422 if the secondary ID is correct. If the secondary ID is not correct, then access is again denied in step 414. However, if the secondary ID is correct, then access is allowed in step 424. For example, a plasma etching machine may require both an RFID and a thumbprint scan to operate the machine.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A Radio Frequency Identification (RFID) base unit, comprising:
   Radio Frequency (RF) circuit adapted to communicate with at least a first and a second RFID circuit type of a plurality of RFID circuit types; and
   a control module including processor means at least coupled to the RF circuit, the processor means of said control module being configured to communicate with external devices through at least a first and a second connection standard of a plurality of connection standards.

2. The RFID base unit of claim 1, wherein the control module is at least configured to be in communication with a computer network.

3. The RFID base unit of claim 1, wherein the plurality of connection standards further comprises at least two of a group comprising BlueTooth, RS232, Universal Serial Bus (USB), Ethernet, Wireless, T-carrier connections, FIREWIRE, Optical fiber, ZIGBEE, and Voice over Internet Protocol (VoIP).

4. The RFID base unit of claim 1, wherein the external device is an automated device.

5. An apparatus for securing an external device with a RFID base unit, comprising:
   means for providing the RFID base unit adapted to communicate with at least a first and a second RFID circuit type of a plurality of RFID circuit types;
   means for interfacing at least one RFID circuit by the RFID base unit, wherein the at least one RFID circuit is a first or a second RFID circuit type; and
   processor means for communicating indicia of engagement or disengagement to effect control of the external device through at least one communication standard of a plurality of communication standards, once the at least one RFID circuit interfaces the RFID base unit.

6. The apparatus of claim 5, wherein the means for communicating further comprises means for disengaging the external device when the at least one RFID circuit is engaged.

7. The apparatus of claim 5, further comprising means for relaying information relating to engagement or disengagement to a computer network.

8. The apparatus of claim 5, wherein said processor means is configured to determine if the at least one RFID circuit is allowed to enable or disable the external device.

9. An apparatus comprising an RFID base unit incorporating a processor wherein the base unit is at least configured to employ two or more connection standards of a plurality of connection standards and said processor is configured for outputting at least one signal adapted to engage or disengage at least one device through at least one connection standard when in communication with an RFID circuit.

10. The apparatus of claim 9, wherein the plurality of communication standards further comprises BlueTooth, RS232, Universal Serial Bus (USB), Ethernet, Wireless, T-carrier connections, FIREWIRE, Optical fiber, ZIGBEE, and Voice over Internet Protocol (VoIP).

11. The apparatus of claim 9 wherein the RFID base unit is adapted to communicate with at least a first and a second RFID circuit type of a plurality of RFID circuit types.

12. A RFID base unit comprising:
   RF (Radio Frequency) circuitry adapted for communicating with at least one of a plurality of RFID circuit types;
   processor means operable to determine if a RFID circuit type presently being communicated with is allowed to communicate with a device external to said RFID base unit signal connection ports configured to communicate with devices external to said RFID base unit, said ports outputting signals in accordance with at least two different connection standards.

13. The apparatus of claim 12, wherein the connection standards comprise at least two of BlueTooth, RS232, Universal Serial Bus (USB), Ethernet, Wireless, T-carrier connections, FIREWIRE, Optical fiber, ZIGBEE, and Voice over Internet Protocol (VoIP).

14. The apparatus of claim 12, wherein said processor means is further operable to communicate a signal to the external device through at least one of said signal connection ports after the determination is made.

15. The apparatus of claim 12, wherein said signal connection ports configured to communicate with devices external to said RFID base unit additionally include at least one universal I/O port.

* * * * *

UNITED STATES PATENT AND TRADEMARK OFFICE
CERTIFICATE OF CORRECTION

PATENT NO. : 7,233,247 B1
APPLICATION NO. : 11/039221
DATED : June 19, 2007
INVENTOR(S) : Adam Crossno, Viswanath Puttagunta and Ravi Kumar Viswaraju It is certified that error appears in the above-identified patent and that said Letters Patent is hereby corrected as shown below:

Col. 8, line 23-33
Claim 12 should read:

12. A RFID base unit comprising:

RF (Radio Frequency) circuitry adapted for communicating with at least one of a plurality of RFID circuit types;
    processor means operable to determine if a RFID circuit type presently being communicated with is allowed to communicate with a device external to said RFID base unit; and
    signal connection ports configured to communicate with devices external to said RFID base unit, said ports outputting signals in accordance with at least two different connection standards.

Signed and Sealed this

Fourteenth Day of August, 2007

JON W. DUDAS
*Director of the United States Patent and Trademark Office*